(12) United States Patent
Zeng et al.

(10) Patent No.: US 9,629,175 B2
(45) Date of Patent: Apr. 18, 2017

(54) METHOD AND APPARATUS FOR SCHEDULING USER DATA

(71) Applicant: Huawei Technologies Co., Ltd., Shenzhen (CN)

(72) Inventors: Kun Zeng, Shenzhen (CN); Yuan Tian, Shenzhen (CN); Yao Lu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 95 days.

(21) Appl. No.: 14/579,449

(22) Filed: Dec. 22, 2014

(65) Prior Publication Data

US 2015/0110053 A1    Apr. 23, 2015

Related U.S. Application Data

(63) Continuation of application No. PCT/CN2013/075814, filed on May 17, 2013.

(30) Foreign Application Priority Data

Jun. 30, 2012   (CN) .......................... 2012 1 0222931

(51) Int. Cl.
*H04W 72/12* (2009.01)
*H04W 52/34* (2009.01)
*H04W 52/36* (2009.01)
*H04W 52/24* (2009.01)

(52) U.S. Cl.
CPC ....... *H04W 72/1205* (2013.01); *H04W 52/34* (2013.01); *H04W 52/367* (2013.01); *H04W 72/1226* (2013.01); *H04W 52/241* (2013.01)

(58) Field of Classification Search
None
See application file for complete search history.

(56) References Cited

U.S. PATENT DOCUMENTS 6,987,738 B2 * 1/2006 Subramanian ...... H04L 12/5693
                                                     370/252
8,812,044 B2 * 8/2014 Hong ................ H04W 72/1231
                                                     370/332
2005/0283687 A1   12/2005 Sutivong et al.
(Continued)

FOREIGN PATENT DOCUMENTS

CN          1870459      11/2006
CN       101183888 A      5/2008
(Continued)

*Primary Examiner* — Eunsook Choi
(74) *Attorney, Agent, or Firm* — Brinks Gilson & Lione

(57) ABSTRACT

Embodiments of the present invention provide a method and an apparatus for scheduling user data, and the method includes: acquiring a power limitation manner in which power limitation is implemented on user data of a user; acquiring an actual scheduling weight of the user after the power limitation is implemented in accordance with the power limitation manner; and transmitting the user data of the user on a resource block according to the actual scheduling weight of the user. This method combines different power limitation manners with scheduling criteria and updates the scheduling weight according to the power limitation manner, so that a scheduling result is more in line with a channel state, and system performance is improved.

13 Claims, 3 Drawing Sheets

(56) References Cited

U.S. PATENT DOCUMENTS

| | | | |
|---|---|---|---|
| 2006/0056451 A1* | 3/2006 | Yano | H04B 7/0417 370/468 |
| 2006/0209764 A1 | 9/2006 | Kim et al. | |
| 2007/0248035 A1* | 10/2007 | Sang | H04W 52/346 370/318 |
| 2008/0075027 A1 | 3/2008 | Lee et al. | |
| 2008/0080449 A1* | 4/2008 | Huang | H04B 7/0634 370/342 |
| 2008/0153530 A1* | 6/2008 | Cho | H04W 72/1231 455/513 |
| 2009/0154419 A1 | 6/2009 | Yoshida et al. | |
| 2009/0238292 A1 | 9/2009 | Clerckx et al. | |
| 2010/0041408 A1 | 2/2010 | Caire et al. | |
| 2010/0130244 A1* | 5/2010 | Hong | H04W 72/1231 455/522 |
| 2010/0157924 A1 | 6/2010 | Prasad et al. | |
| 2012/0033625 A1 | 2/2012 | Nagata et al. | |
| 2012/0057541 A1 | 3/2012 | Choi et al. | |

FOREIGN PATENT DOCUMENTS

| | | |
|---|---|---|
| CN | 101466151 A | 6/2009 |
| CN | 101998655 A | 3/2011 |
| CN | 102316596 A | 1/2012 |
| CN | 102420645 A | 4/2012 |
| EP | 1227626 A2 | 7/2002 |
| EP | 2285172 A2 | 2/2011 |

* cited by examiner

METHOD AND APPARATUS FOR SCHEDULING USER DATA

CROSS-REFERENCE TO RELATED APPLICATIONS

This application is a continuation application of International Application No. PCT/CN2013/075814, filed on May 17, 2013, which claims priority to Chinese Patent Application No. 201210222931.7, filed on Jun. 30, 2012, both of which are incorporated herein by reference in their entireties.

TECHNICAL FIELD

Embodiments of the present invention relate to the field of communication technology, and more particularly, to a method and an apparatus for scheduling user data.

BACKGROUND

In the existing wireless communication systems, such as long term evolution (Long Term Evolution, LTE), multiple input multiple output (Multiple Input Multiple Output, MIMO) technology has been widely adopted. In a multi-user MIMO system, data of multiple users are pre-coded and transmitted as a whole. There are two main types of common pre-coding schemes, that is, linear pre-coding and non-linear pre-coding, and the pre-coding plays an important role on eliminating user interference in the multi-user MIMO system. For the non-linear pre-coding, the power of the pre-coded data will raise greatly, while in the communication system, generally it is needed to perform power limiting process on the power of the data after the non-linear pre-coding due to hardware constraints, so as to limit the transmission power within a certain range, and various existing power limitation schemes will cause influence to the transmission rate of the user data.

Furthermore, since bandwidth is a very limited resource, and how to perform appropriate resource scheduling on a resource block is a critical issue. However, the inventor of the present invention has found that, in the non-linear pre-coding system, the original transmission rate of the user is changed due to the power limiting process, while the original transmission rate of the user data is still adopted in the existing resource scheduling scheme, and therefore, it is difficult to achieve accurate scheduling of the user data.

SUMMARY

Embodiments of the present invention provide a method and an apparatus for scheduling user data, so as to achieve accurate scheduling of the user data.

One aspect of the present invention provides a method for scheduling user data, including:

acquiring a power limitation manner in which power limitation is implemented on user data of a user;

acquiring an actual scheduling weight of the user after the power limitation is implemented in accordance with the power limitation manner; and transmitting the user data of the user on a resource block according to the actual scheduling weight of the user.

Another aspect of the present invention provides an apparatus for scheduling user data, including:

a first acquiring module, configured to acquire a power limitation manner in which power limitation is implemented on user data of a user;

a second acquiring module, configured to acquire an actual scheduling weight of the user after the power limitation is implemented in accordance with the power limitation manner; and a transmitting and processing module, configured to transmit the user data of the user on a resource block according to the actual scheduling weight of the user.

In the scheduling method in the communication system provided by the above technical solutions, the power limitation manner in which power limitation is implemented on user data of each user and the rate loss when the power limitation is implemented in accordance with the power limitation manner are acquired, and the instantaneous transmission rate is further corrected to obtain the actual instantaneous transmission rate, the scheduling weight of each user is updated according to the actual instantaneous transmission rate, and then scheduling of the user data is performed according to the priority of each user, so that a scheduling result is more in line with a channel state, and system performance is improved.

DESCRIPTION OF EMBODIMENTS

The technical solutions in embodiments of the present invention are hereinafter described clearly and completely with reference to the accompanying drawings in the embodiments of the present invention. Obviously, the embodiments described here are part of the embodiments of the invention but not all of the embodiments. All other embodiments, which can be derived by persons skilled in the art from the embodiments given herein without creative efforts, shall fall within the protection scope of the present invention.

Figure 1:
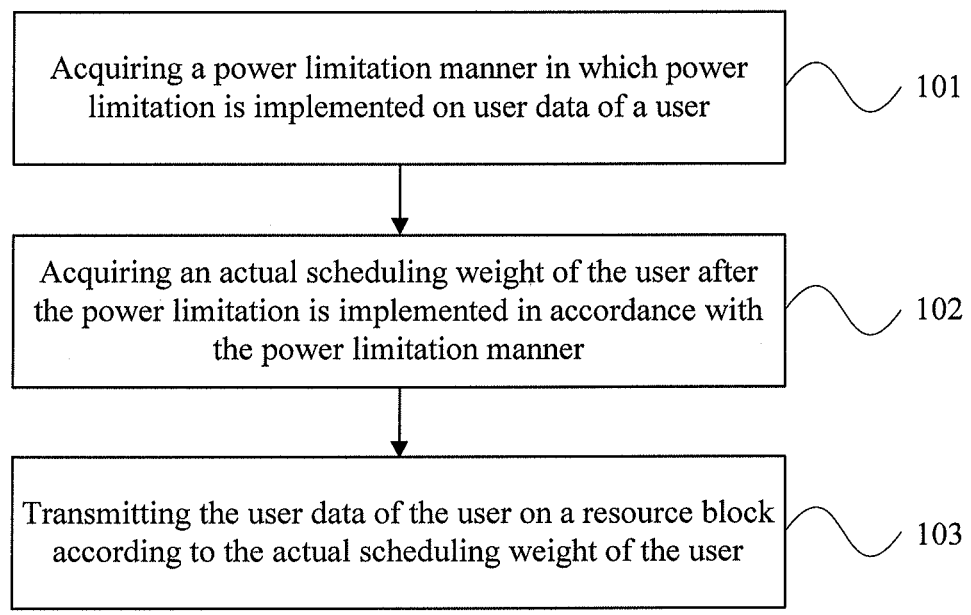
FIG. 1 is a schematic flowchart of a method for scheduling user data according to an embodiment of the present invention.

FIG. 1 is a schematic flowchart of a method for scheduling user data according to an embodiment of the present invention. As shown in FIG. 1, a method for scheduling user data, including:

S101, Acquiring a power limitation manner in which power limitation is implemented on user data of a user;

In particular, when the user data of multiple users is scheduled in the embodiments of the present invention, this step is: acquiring the power limitation manner in which power limitation is implemented on user data of the multiple users.

The acquiring the power limitation manner in which power limitation is implemented on user data of each user can specifically include:

comparing power loss of the user data of the user in multiple power limitation manners, and selecting the power limitation manner with the minimum power loss as the power limitation manner of the user data of the user, and acquiring corresponding power loss. The power loss is the loss caused when the power limitation is implemented, which can cause the loss of the signal power to interference plus noise power ratio, or the loss of the transmission rate.

S102, Acquiring an actual scheduling weight of the user after the power limitation is implemented in accordance with the power limitation manner, when user data of multiple users is scheduled, the step is also: acquiring an actual scheduling weight of the multiple users;

When proportional fairness (Proportional Fairness, PF) scheduling algorithm is performed, the scheduling weight also can be indicated by a PF weight, which is defined to be:

$$P_i(t) = \frac{C_i(t)}{[T_i(t)]^\alpha}$$

$$i = 1, 2, \ldots, N$$

Here, $C_i(t)$ indicates an instantaneous transmission rate of the i-th user at time t, which is, in this embodiment, an instantaneous transmission rate of the user data of each user obtained by acquiring a rate loss $\Delta C$ when the power limitation is implemented in accordance with the power limitation manner, and then correcting the $\Delta C$, that is, the instantaneous transmission rate is an actual instantaneous transmission rate; $T_i(t)$ indicates a throughput of the user within a time window ended with t, that is, a throughput within the current time window, $\alpha$ indicates a fairness exponential factor (usually is 1), it can be seen from the above formula that, a scheduling weight of each user is a ratio of the actual instantaneous transmission rate of the user data of each user to a throughput of each user within the current time window. When data transmission is performed continuously by a user, as a numerator becomes lager, the user priority becomes smaller. In the long run, it is a fair scheduling algorithm that users within the cell occupy the same time lengths to perform data transmission.

However, technical solutions of the present invention are not limited to the PF scheduling criterion, but also can be other scheduling criteria, such as maximum carrier-to-interference ratio scheduling, and in this scenario, the step 102 includes:

acquiring a signal power to interference plus noise power ratio when the power limitation is implemented in accordance with the power limitation manner;

acquiring an actual scheduling weight of the user according to the signal power to interference power ratio.

S103, Transmitting the user data of the user on a resource block according to the actual scheduling weight of the user.

When PF scheduling and maximum carrier-to-interference ratio scheduling are performed, the transmitting the user data of each user on the resource block according to the actual scheduling weight of the user in this step can specifically include:

transmitting the user data of the user with a higher scheduling weight by means of the resource block.

In the above embodiments of the present invention, for the user data after the non-linear pre-coding, the rate loss $\Delta C$ is corrected constantly according to different power limitation manners, so as to better combine with the linear PF scheduling method, and improve scheduling performance, and the above non-linear pre-coding can be Tomlinson-Harashima precoding—dirty paper coding (Tomlinson-Harashima Precoding—Dirty Paper Coding, THP-DPC).

In terms of layered resource blocks, since the power limitation manners in which power limitation is implemented on user data on each layer are different, the rate loss $\Delta C$ also needs to be calculated according to different power limitation manners. In particular, the S101 above can specifically be:

acquiring the rate loss of the user data of the user when the power limitation is implemented by the modulo operation, if the user data of the user is determined as a power limitation manner of taking the modulo operation in a previous determined scheduling process; acquiring the rate loss of the user data of the user when the power limitation is implemented by linear power normalization, if the user data of the user is determined as a power limitation manner of performing linear power normalization; otherwise, selecting a power limitation manner with smaller rate loss when the power limitation is implemented by the modulo operation or linear power normalization as the power limitation manner in which power limitation is implemented on user data of a user, and acquiring corresponding rate loss.

In the above embodiments of the present invention, the acquiring the rate loss of the user data of the user when the power limitation is implemented by the modulo operation, specifically is:

determining a user data modulating manner of the user according to the signal power to interference plus noise power ratio of the user;

acquiring a loss of a signal power to interference plus noise power ratio according to the user data modulating manner after the modulo operation is performed to the user data of the user;

acquiring the rate loss of the user data of the user according to the loss of the signal power to interference plus noise power ratio after the modulo operation;

The acquiring the rate loss specifically is: determining the modulating manner according to the signal power to interference plus noise power ratio of the user, acquiring the loss of the signal to interference plus noise ratio of the user after modulo operation by looking up a table according to the modulating manner, updating the signal power to interference plus noise power ratio of the user, determining a modulating and encoding manner according to the updated signal power to interference plus noise power ratio of the user, and accordingly calculating the rate loss by the modulating and encoding mode;

Furthermore, the acquiring the rate loss of the user data of the user when the power limitation is implemented by linear power normalization, specifically is:

acquiring the loss of the signal power to interference plus noise power ratio after the user data of the user is implemented by linear power normalization, according to a transmission power of transmitting the user data of the user, and a transmission power of counteracting the interference of a scheduled user within the same time period;

acquiring the rate loss of the user data of the user according to the loss of the signal power to interference plus noise power ratio after the linear power normalization. In the above embodiments of the present invention, the following steps may further be included:

notifying a data receiver of the power limitation manner in which power limitation is implemented on user data of each user. In this way, the data receiver can know the corresponding power limitation manner and perform decoding.

Figure 2:
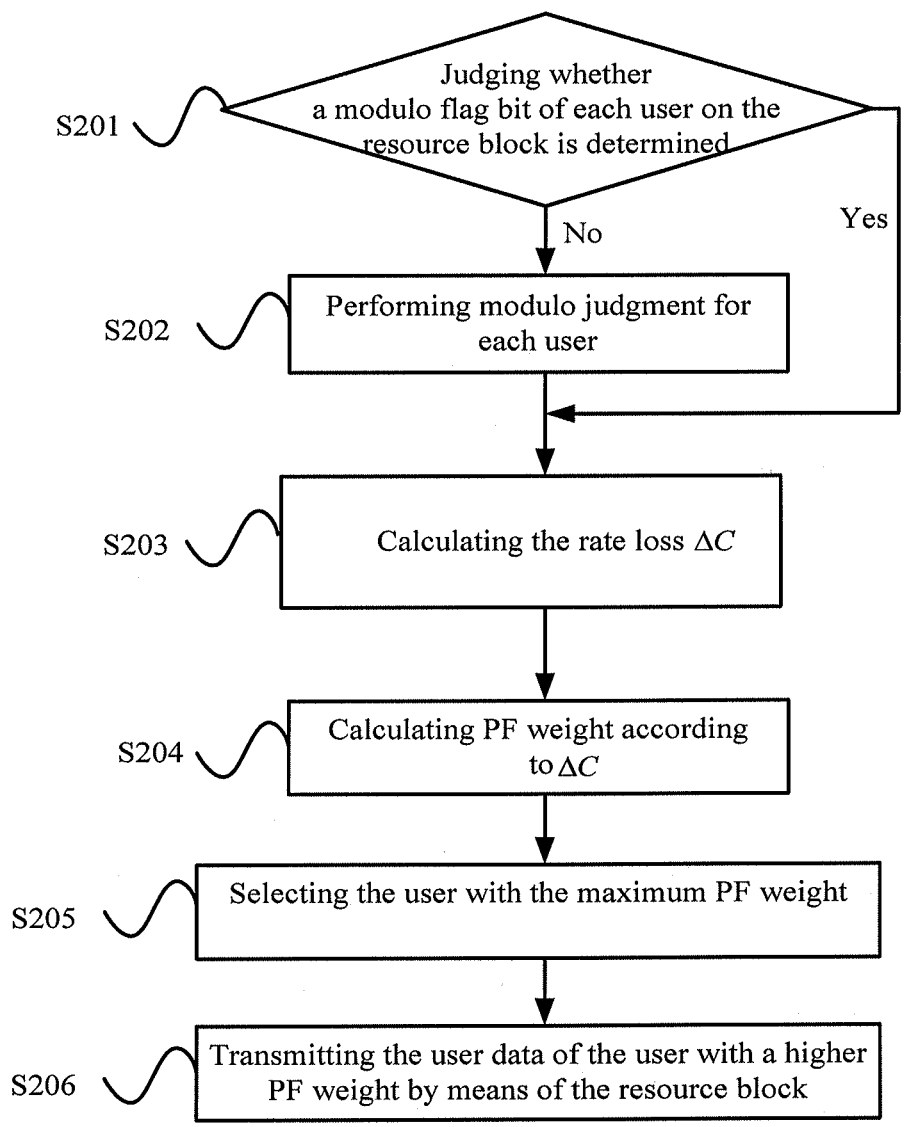
FIG. 2 is a schematic flowchart of a method for scheduling user data according to another embodiment of the present invention.

FIG. 2 is a schematic flowchart of a method for scheduling user data according to another embodiment of the present invention, with reference to FIG. 2, the method includes steps as follows:

S201, Judging whether a modulo flag bit of each user on the resource block is determined. If yes, continue step S203, otherwise, continue step S202;

Specifically, it is necessary to judge whether the modulo flag bit of each user on the resource block is determined when scheduling the resource block. If yes, selecting a corresponding power limitation manner according to the modulo flag bit to calculate the rate loss ΔC, if not, then perform modulo judgment in step S202.

S202, Performing modulo judgment for each user;

In particular, calculating the rate loss A and λ for each user with an undetermined modulo flag bit respectively in accordance with an modulo flag bit of 1 (modulo operation) and an modulo flag bit of 0 (linear power normalization), and comparing the sizes of A and λ. If A≥λ, determining not to perform modulo operation for the user, but to perform an operation of linear power normalization; if A<λ, determining to perform modulo operation for the user. Meanwhile, setting the modulo flag bit of the user according to the modulo judging result, so that the data receiver can know the power limitation manner of the user data.

S203, Calculating the rate loss ΔC.

For example, in particular, when a user is scheduled in a first layer of the resource block, because there is no interference from the user in the prior layer within the same time-frequency resource block, it can be calculated by linear power normalization to obtain λ=0, then a power limitation manner of performing linear power normalization is selected for the user in the first layer of the resource block, and the modulo flag bit of the user is 0.

When the user is scheduled in the second layer and each posterior layer of the resource block, if the modulo flag bit of the user is 1, the rate loss can be predetermined in advance under different channel states and different modulating manners by methods such as calculation, simulation or measurement, and pre-stored in a transmitter. The transmitter determines the rate loss ΔC=A during the modulo operation by looking up a table according to the current channel state, modulating manner, and the channel state can be represented by a signal to interference plus noise ratio (Signal to Interference plus Noise Ratio, SINR). For example, the table looking-up manner as follows can be used.

If the modulo flag bit of the user is 1, determining the corresponding modulating manner by looking up the table according to the SINR of the user, acquiring the loss of the signal to interference plus noise ratio of the user after modulo operation by looking up the table according to the modulating manner, updating the signal power to interference plus noise power ratio of the user, determining a modulating and encoding manner according to the signal power to interference plus noise power ratio updated by the user, and accordingly calculating the rate loss by the modulating and encoding manner.

| Modulating manner | Loss M (dB) |
|---|---|
| QPSK | −4 |
| 16QAM | −1.5 |
| 64QAM | −1 |

If the modulo flag bit of the user is 0, calculating the rate loss λ caused by linear power normalization, ΔC=λ. The λ is calculated by the equation as follows:

$$\lambda_i = 10\log_{10}\left(1 - \frac{1}{p_i}\sum_{j<i} p_j^i\right)$$

in which, $p_i$ is a transmission power of user i, $p_j^i$ is an interference power caused by user j to user i. Under a THP-DPC encoding manner, only the user scheduled before user i can cause interference to user i.

S204, Calculating PF weight according to ΔC.

The specific calculating method is as follows: the transmitter updates the instantaneous rate C'(t)=C(t)−ΔC of the user by the obtained rate loss ΔC, and the PF weight of the user on the resource block is calculated according to the calculating formula given by the embodiment shown in FIG. 1.

S205, Selecting the user with the maximum PF weight;

S206, Transmitting the user data of the user with a higher PF weight by means of the resource block. The data receiver can also know the power limitation manner of the user data according to the modulo flag bit.

In the above embodiments of the present invention, when resource blocks on different layers are scheduled, select different power limitation manners for different users, and calculate corresponding rate loss, so as to make the final PF weight more accurate.

Figure 3:
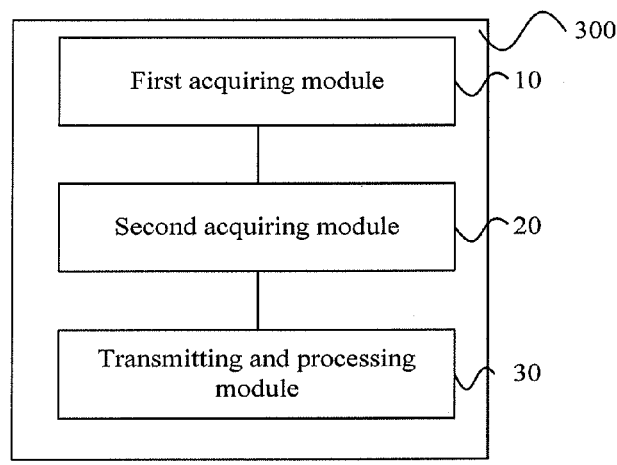
FIG. 3 is a schematic diagram of an apparatus for scheduling user data according to still another embodiment of the present invention.
Figure 4:
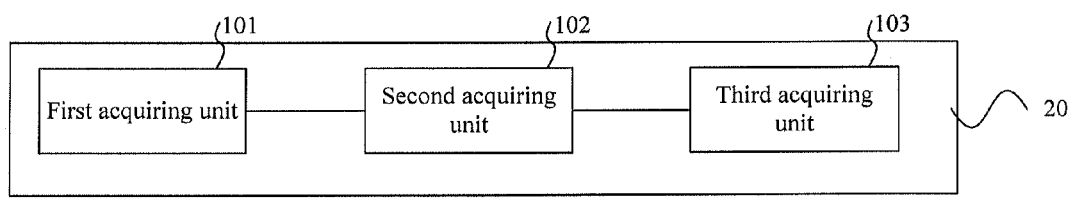
FIG. 4 is a structural schematic diagram of a second acquiring module according to still another embodiment of the present invention.

FIG. 3 is a schematic diagram of an apparatus for scheduling user data according to still another embodiment of the present invention, and FIG. 4 is a structural schematic diagram of a second acquiring module according to still another embodiment of the present invention.

With reference to FIG. 3, which shows an apparatus 300 for scheduling user data according to still another embodiment of the present invention, and the apparatus can be an LTE base station, or an LTE base station for achieving the above data scheduling, including:

a first acquiring module 10, configured to acquire a power limitation manner in which power limitation is implemented on user data of a user, a second acquiring module 20, configured to acquire an actual scheduling weight of the user after the power limitation is implemented in accordance with the power limitation manner; and a transmitting and processing module 30, configured to transmit the user data of the user on a resource block according to the actual scheduling weight of the user, and specifically configured to transmit the user data of the user with a higher scheduling weight by means of the resource block.

The first acquiring module 10 and the second acquiring module 20 can be a processor of a base station or a logic unit of a processing unit, and the transmitting and processing module 30 is an antenna coupled to a transmission circuit of a base station.

The first acquiring module 10 is specifically configured to compare power loss of the user data of the user in multiple power limitation manners, and select the power limitation manner with the minimum power loss as the power limitation manner of the user data of the user. When the actual scheduling weight of each user is calculated according to the PF scheduling criterion, however, the second acquiring module 20 acquires a rate loss (A or λ) when the power limitation is implemented in accordance with the power limitation manner, assigns values to ΔC, and updates the actual transmission rate $C_i(t)$ of the user, and further acquires the actual scheduling weight. With reference to FIG. 4, the second acquiring module includes:

a first acquiring unit 101, configured to acquire a rate loss when the power limitation is implemented in accordance with the power limitation manner ΔC ;

a second acquiring unit 102, configured to acquire an actual instantaneous transmission rate C'(t) of the user data of the user according to the rate loss;

a third acquiring unit 103, configured to take a ratio of the actual instantaneous transmission rate C'(t) of the user data of the user to a throughput $T_i(t)$ of the user within the current time window as a scheduling weight (i.e., PF weight) of each user.

The transmitting and processing module is specifically configured to transmit the user data of the user with a higher scheduling weight by means of the resource block.

Figure 5:
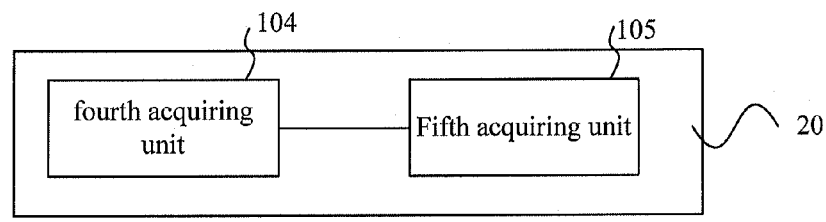
FIG. 5 is another structural schematic diagram of a second acquiring module according to still another embodiment of the present invention.

FIG. 5 is another structural schematic diagram of a second acquiring module according to still another embodiment of the present invention. The structure of the second acquiring module 20 shown in FIG. 4 is to take the PF scheduling criterion as an example, but the present invention is not limited thereto, for example, in the maximum carrier-to-interference ratio scheduling criterion, the structure of the second acquiring module 20 can be as shown in FIG. 5, and then the second acquiring module 20 includes:

a fourth acquiring unit 104, configured to acquire a signal power to interference plus noise power ratio when the power limitation is implemented in accordance with the power limitation manner;

a fifth acquiring unit 105, configured to acquire an actual scheduling weight of each user according to the signal power to interference plus noise power ratio.

The PF scheduling criterion will be described as an example below in detail.

The first acquiring unit 101 is specifically configured to acquire the rate loss A of the user data of the user when the power limitation is implemented by the modulo operation (the modulo flag bit is 1), if the user data of the user is determined as a power limitation manner of taking the modulo operation; acquire the rate loss λ of the user data of the user when the power limitation is implemented by linear power normalization (the modulo flag bit is 0), if the user data of the user is determined as a power limitation manner of performing linear power normalization; otherwise, select a power limitation manner with smaller rate loss when the power limitation is implemented by the modulo operation or linear power normalization as the power limitation manner in which power limitation is implemented on user data of a user, and acquire corresponding rate loss ΔC.

Moreover, the acquiring, by the first acquiring unit 101, the rate loss of the user data of the user when the power limitation is implemented by the modulo operation, specifically is: determining a user data modulating manner of the user according to the signal power to interference plus noise power ratio of the user; acquiring a loss of a signal power to interference plus noise power ratio according to the user data modulating manner after the modulo operation is performed to the user data of the user; and acquiring the rate loss ΔC of the user data of the user according to the loss of the signal power to interference plus noise power ratio after the modulo operation;

the acquiring, by the first acquiring unit 101, the rate loss of the user data of the user when the power limitation is implemented by linear power normalization, specifically is: acquiring the loss of the signal power to interference plus noise power ratio after the user data of the user is implemented by linear power normalization, according to a transmission power of transmitting the user data of the user, and a transmission power of counteracting the interference of a scheduled user; acquiring the rate loss ΔC of the user data of the user according to the loss of the signal power to interference plus noise power ratio after the linear power normalization.

In the method and apparatus provided in the embodiments of the present invention, adaptive modulo and scheduling criteria are combined, the scheduling weight is updated by the modulo judgment and notified to the data receiver by the modulo flag bit, so that a scheduling result is more in line with a channel state, and system performance is improved.

Persons skilled in the art can understand that, all or partial steps of the above method embodiments can be implemented in a program instruction related hardware. The program can be stored in a computer readable medium. When the program is executed, the steps in the above method embodiments are performed; the storage medium includes various media capable of storing program codes, such as a read only memory (ROM), a random access memory (RAM), a floppy disk, or an optical disk and the like.

Finally, it should be noted that the above embodiments are merely provided for describing the technical solutions of the present invention, but not intended to limit the present invention. It should be understood by persons skilled in the art that although the present invention has been described in detail with reference to the foregoing embodiments, modifications can be made to the technical solutions described in the foregoing embodiments, or equivalent replacements can be made to partial or all technical features in the technical solutions; however, such modifications or replacements do not cause the essence of corresponding technical solutions to depart from the scope of the embodiments of the present invention.

What is claimed is:

1. A method for scheduling user data, comprising:

acquiring by a base station, a power limitation manner in which power limitation is implemented on user data of a user;

acquiring, by the base station, an actual scheduling weight of the user after the power limitation is implemented in accordance with the power limitation manner; and transmitting by the base station, the user data of the user on a resource block according to the actual scheduling weight of the user, wherein the acquiring the power limitation manner in which power limitation is implemented on the user data of the user, comprises: comparing power loss of the user data of the user in multiple power limitation manners, and selecting the power limitation manner with the minimum power loss as the power limitation manner of the user data of the user, wherein the selected power limitation manner is one of a modulo operation and a linear power normalization.

2. The method for scheduling user data according to claim 1, wherein, the acquiring the actual scheduling weight of the user after the power limitation is implemented in accordance with the power limitation manner, comprises:

acquiring a signal power to interference plus noise power ratio when the power limitation is implemented in accordance with the power limitation manner;

acquiring an actual scheduling weight of the user according to the signal power to interference plus noise power ratio;

the transmitting the user data of the user on the resource block according to the actual scheduling weight of the user, comprises:
   transmitting the user data of the user with a higher scheduling weight by means of the resource block.

3. The method for scheduling user data according to claim 1, wherein, the acquiring the actual scheduling weight of the user after the power limitation is implemented in accordance with the power limitation manner, comprises:
   acquiring rate loss when the power limitation is implemented in accordance with the power limitation manner;
   acquiring an actual instantaneous transmission rate of the user data of the user according to the rate loss;
   taking a ratio of the actual instantaneous transmission rate of the user data of the user to a throughput of the user within a current time window as a scheduling weight of each user;
   the transmitting the user data of the user on the resource block according to the actual scheduling weight of the user, comprises:
   transmitting the user data of the user with a higher scheduling weight by means of the resource block.

4. The method for scheduling user data according to claim 3, wherein, the acquiring the rate loss when the power limitation is implemented in accordance with the power limitation manner, comprises:
   acquiring the rate loss of the user data of the user when the power limitation is implemented by the modulo operation, if the user data of the user is determined as a power limitation manner of taking the modulo operation in a determined scheduling process; acquiring the rate loss of the user data of the user when the power limitation is implemented by the linear power normalization, if the user data of the user is determined as a power limitation manner of performing linear power normalization; otherwise, selecting a power limitation manner with smaller rate loss when the power limitation is implemented by the modulo operation or linear power normalization as the power limitation manner in which power limitation is implemented on user data of a user, and acquiring corresponding rate loss.

5. The method for scheduling user data according to claim 4, wherein, the acquiring the rate loss of the user data of the user when the power limitation is implemented by the modulo operation, comprises:
   determining a user data modulating manner of the user according to the signal power to interference plus noise power ratio of the user;
   acquiring loss of a signal power to interference plus noise power ratio according to the user data modulating manner after the modulo operation is performed to the user data of the user;
   acquiring the rate loss of the user data of the user according to the loss of the signal power to interference plus noise power ratio after the modulo operation; and
   wherein, the acquiring the rate loss of the user data of the user when the power limitation is implemented by linear power normalization, specifically is:
   acquiring the loss of the signal power to interference plus noise power ratio after the user data of the user is implemented by linear power normalization, according to a transmission power of transmitting the user data of the user, and a transmission power of counteracting the interference of a scheduled user within the same time-frequency resource block;
   acquiring the rate loss of the user data of the user according to the loss of the signal power to interference plus noise power ratio after the linear power normalization.

6. The method for scheduling user data according to claim 4, further comprising: notifying a data receiver of the power limitation manner in which power limitation is implemented on user data of a user.

7. The method for scheduling user data according to claim 1, wherein, the acquiring the power limitation manner in which power limitation is implemented on the user data of the user, comprises:
   acquiring the power limitation manner in which the power limitation is implemented on the user data after non-linear pre-coding.

8. An apparatus for scheduling user data, comprising a processor and a non-transitory processor-readable medium, the processor executing program codes stored in the non-transitory processor-readable medium, which configures the apparatus to:
   acquire a power limitation manner in which power limitation is implemented on user data of a user;
   acquire an actual scheduling weight of the user after the power limitation is implemented in accordance with the power limitation manner; and
   transmit the user data of the user on a resource block according to the actual scheduling weight of the user, wherein
   the apparatus is specifically configured to compare power loss of the user data of the user in multiple power limitation manners, and select the power limitation manner with minimum power loss as the power limitation manner of the user data of the user, wherein the selected power limitation manner is one of a modulo operation and a linear power normalization.

9. The apparatus for scheduling user data according to claim 8, wherein the apparatus is configured to:
   acquire a rate loss when the power limitation is implemented in accordance with the power limitation manner;
   acquire an actual instantaneous transmission rate of the user data of the user according to the rate loss;
   take a ratio of the actual instantaneous transmission rate of the user data of the user to a throughput of the user within the current time window as a scheduling weight of each user;
   transmit the user data of the user with a higher scheduling weight by means of the resource block.

10. The apparatus for scheduling user data according to claim 9, wherein the apparatus is configured to acquire the rate loss of the user data of the user when the power limitation is implemented by the modulo operation, if the user data of the user is determined as a power limitation manner of taking the modulo operation; acquire the rate loss of the user data of the user when the power limitation is implemented by the linear power normalization, if the user data of the user is determined as a power limitation manner of performing linear power normalization; otherwise, select a power limitation manner with smaller rate loss when the power limitation is implemented by the modulo operation or linear power normalization as the power limitation manner in which power limitation is implemented on user data of a user, and acquire corresponding rate loss.

11. The apparatus for scheduling user data according to claim 8, wherein the apparatus is configured to:

acquire a signal power to interference plus noise power ratio when the power limitation is implemented in accordance with the power limitation manner;

acquire an actual scheduling weight of the user according to the signal power to interference plus noise power ratio.

12. The apparatus for scheduling user data according to claim 11, wherein the acquiring, by the apparatus, the rate loss of the user data of the user when the power limitation is implemented by the modulo operation, comprises: determining a user data modulating manner of the user according to the signal power to interference plus noise power ratio of the user; acquiring a loss of a signal power to interference plus noise power ratio according to the user data modulating manner after the modulo operation is performed to the user data of the user; and acquiring the rate loss of the user data of the user according to the loss of the signal power to interference plus noise power ratio after the modulo operation;

the acquiring, by the apparatus, the rate loss of the user data of the user when the power limitation is implemented by linear power normalization, specifically is: acquiring the loss of the signal power to interference plus noise power ratio after the user data of the user is implemented by linear power normalization, according to a transmission power of transmitting the user data of the user, and a transmission power of counteracting the interference of a scheduled user; acquiring the rate loss of the user data of the user according to the loss of the signal power to interference plus noise power ratio after the linear power normalization.

13. The apparatus for scheduling user data according to claim 8, wherein the apparatus is configured to acquire the power limitation manner in which the power limitation is implemented on the user data after non-linear pre-coding.

* * * * *